May 14, 1968 — S. S. CHANDLER — 3,383,309
ANAEROBIC SLUDGE DIGESTION
Filed Oct. 13, 1965 — 3 Sheets-Sheet 1
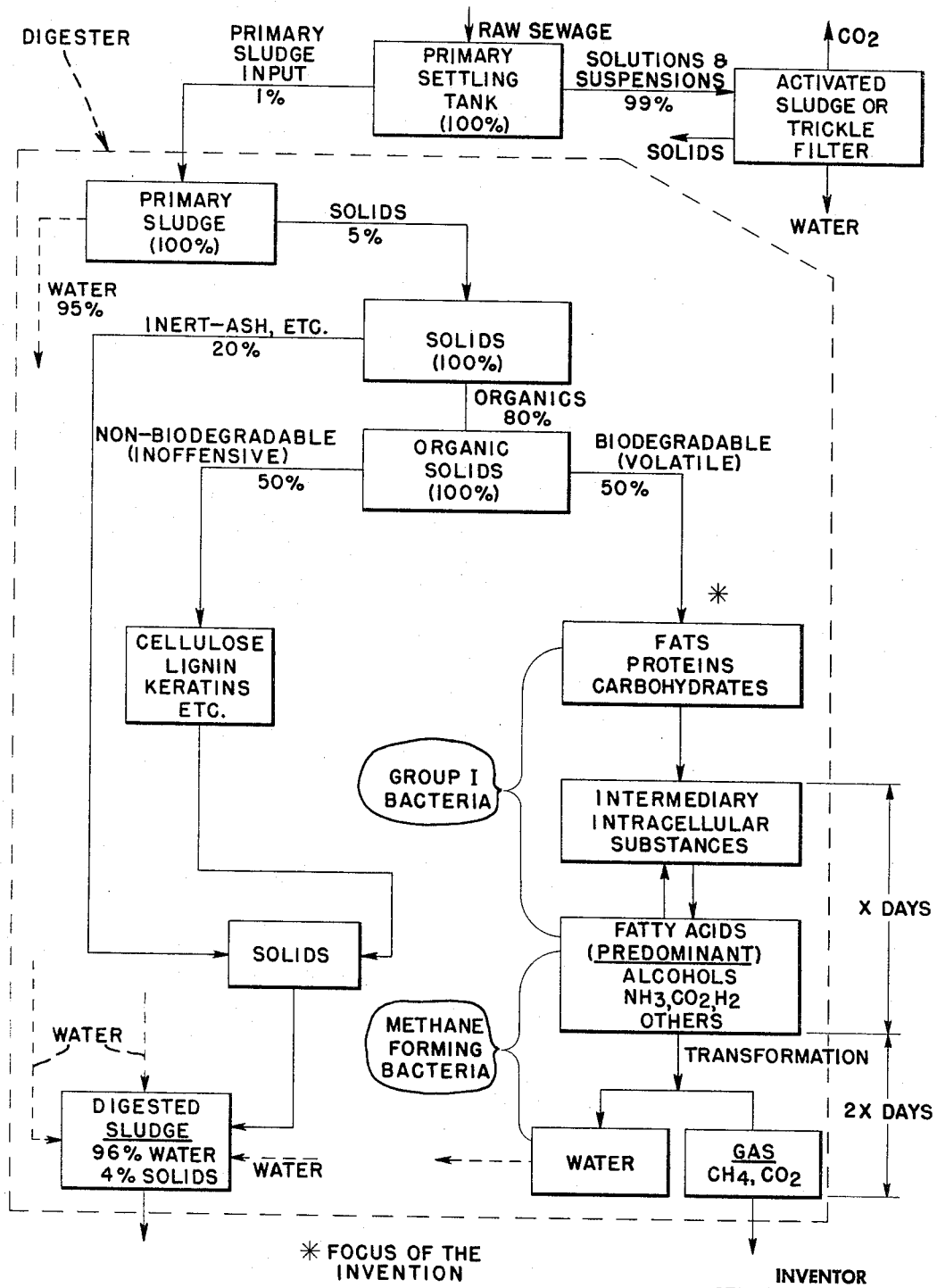
FIG_1
* FOCUS OF THE INVENTION
INVENTOR
STEPHEN S. CHANDLER
BY Hans G. Hoffmeister
ATTORNEY

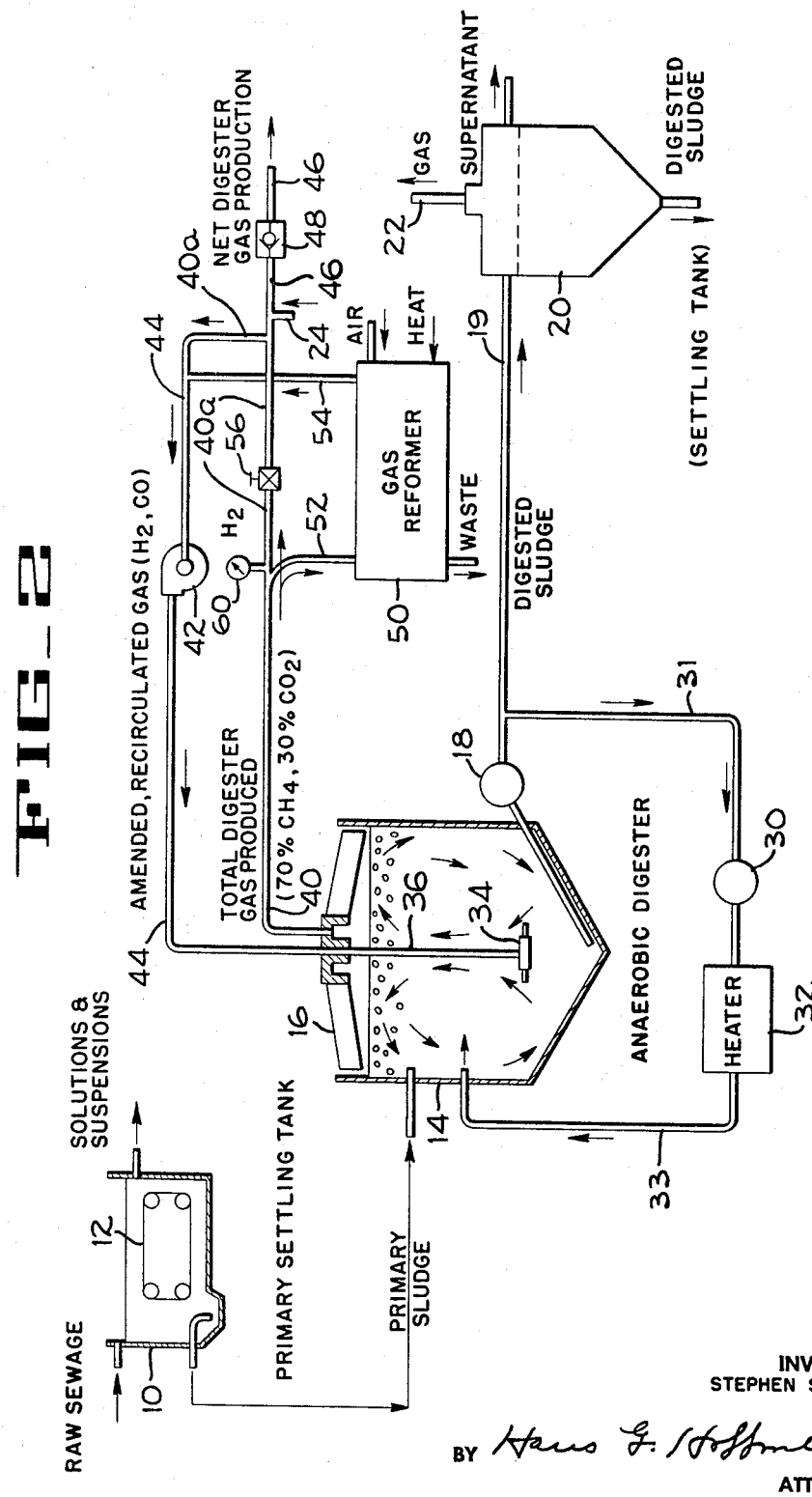

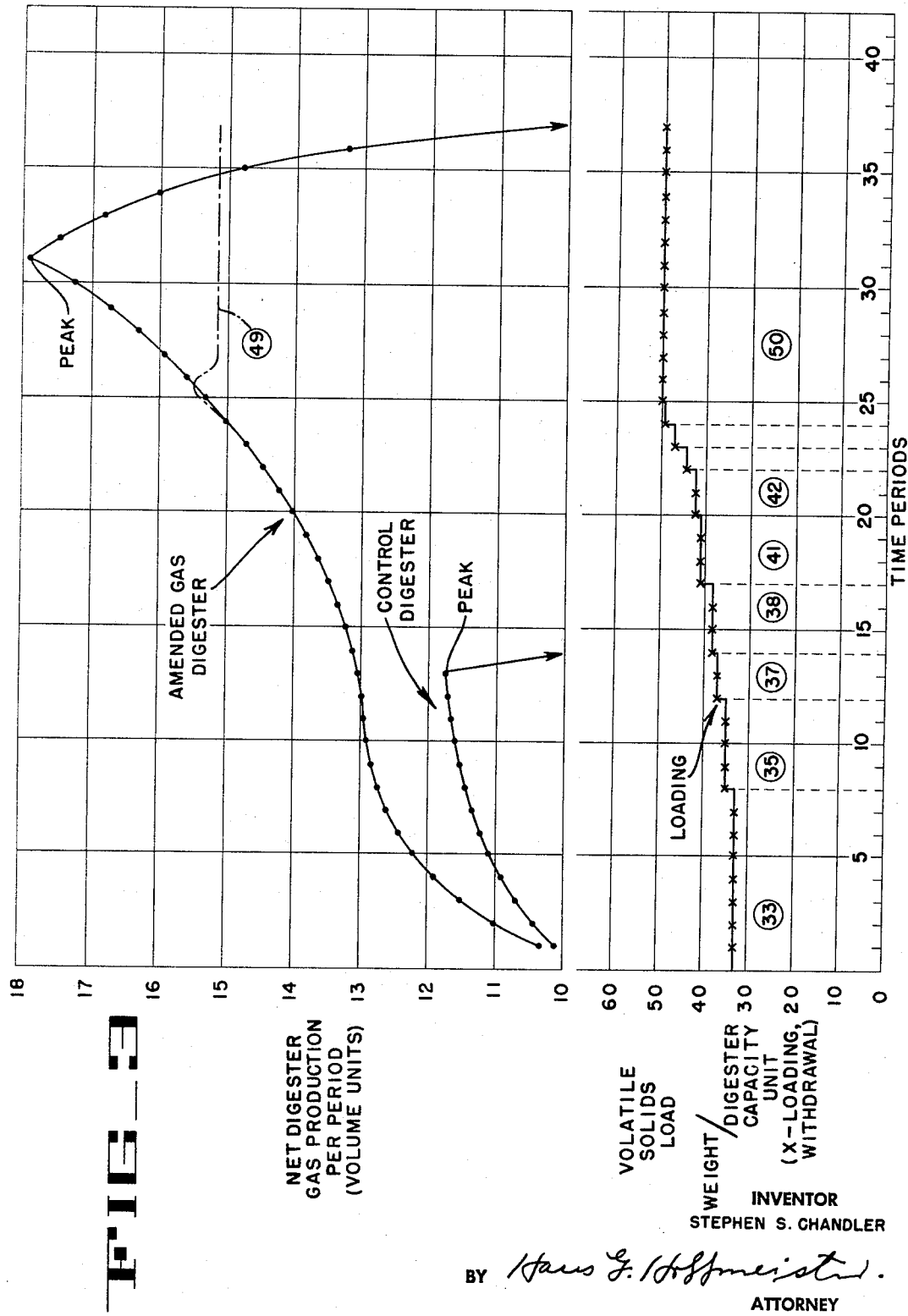

3,383,309
ANAEROBIC SLUDGE DIGESTION

Stephen S. Chandler, Los Altos, Calif., assignor to FMC Corporation, San Jose, Calif., a corporation of Delaware
Filed Oct. 13, 1965, Ser. No. 495,538
11 Claims. (Cl. 210—11)

ABSTRACT OF THE DISCLOSURE

In the anaerobic digestion of sewage sludge, the action of methane forming bacteria is increased by cracking digester gases removed from the digester so as to obtain hydrogen gas, and introducing the hydrogen gas along with recycled digester gases into the digester sludge. The amount of hydrogen gas thus introduced is sufficient to insure that some hydrogen gas is present in the digester gases that are removed from the digester, thus indicating that adequate hydrogen has been introduced to supply the energy requirements of the methane forming bacteria.

---

This invention relates to sewage disposal, and more particularly to the anaerobic digestion of sewage sludge. This invention is an improvement in the sewage digestion process of the Forrest Patent 2,777,815, issued Jan. 15, 1957, and assigned to the assignee of the present invention.

Raw sewage contains organic material formed of fats, proteins and carbohydrates and although these materials make up a very small percentage of the total volume of the sewage, they represent the most objectionable components of the sewage. Thus, as evidenced by the aforesaid Forrest patent, it is customary to separate out from the raw sewage, materials containing these components, and the separation is performed early in the sewage disposal process. These objectionable, and often offensive components are then biologically degraded and transformed into gases, which present no disposal problem and which, in fact, may even be useful by-products of the sewage disposal system.

The role of sludge digestion

In the system of the present invention, and as in that of the aforesaid Forrest patent, the fats, proteins and carbohydrates which are biologically degradeable (biodegradeable) are converted into methane, carbon dioxide and trace gases by a digestion process carried out in a sludge digester. The organic solids in the raw sewage (which include the biodegradeable materials referred to), are separated from the raw sewage in a primary settling tank to form a "primary sludge." On a volume basis, the primary sludge represents a relatively small percentage of the total raw sewage, and on the same basis, the primary sludge is principally water. However, the presence of these organic materials results in the formation of colloids, which render separation of the solids in the primary sludge from the water (dewatering) difficult, and thus dewatering is not feasible when reliance is placed solely on the use of simple settling tanks or the like.

It has also been found that of the organic materials in the primary sludge derived from the primary settling tank, the biodegradeable (volatile) organic components, namely the fats, proteins and carbohydrates are not only responsible for the offensive effects of the sewage, but also exist as colloids and fine suspensions, which render the dewatering process difficult and time consuming. It is the role of the digestion process to transform the biodegradeable organic materials in the primary sludge into readily disposable (or even usable) gases. In the system of the present invention, this transformation is performed by anaerobic digestion, to produce methane and carbon dioxide gases derived from the fats, proteins and carbohydrates embodied in the primary sludge.

Anaerobic digestion of the primary sludge

The anaerobic digestion is carried out by at least two general groups of bacteria in the sludge, namely, bacteria which will be referred to as "Group I" bacteria, and a Group II or "methane forming" bacteria. These bacteria act in series, in the sense that the Group I bacteria convert the fats, proteins and carbohydrates into fatty acids (predominant) and other substances; whereupon, the Group II, or methane forming bacteria, transform the fatty acids produced by the Group I bacteria into methane and carbon dioxide gases. The latter transformation also produces some water. This progressive process not only disposes of the offensive organic materials in the primary sludge, but by so doing, disposes of those materials which are principally responsible for impeding the dewatering of the sludge. Thus the digested sludge leaving the digester can be readily separated into water and non-offensive solids in the settling tank or the like, that receives the digested sludge from the digester.

The focus of the invention

The conversion in the digester of the fat, protein and carbohydrate group of organic solids found in primary sludge into fatty acids (principally acids in the lower molecular weight group), and more elemental compounds or elements by the Group I bacteria, if adequately followed up, provides no serious problems. This is particularly true when digester gas is recirculated through the digester, as taught by the aforesaid Forrest patent. The limiting bacterial metabolic process carried in the digester is believed to be that effected by the methane forming bacteria in their biodegradation and transformation of the fatty acids and other elements evolved by the Group I bacteria, into methane and carbon dioxide gases, with the attendant production of water.

As mentioned, the Group I and the methane forming bacteria can be considered to act (insofar as their effects are concerned) in series or sequentially, with the methane forming bacteria operating on products evolved by the Group I bacteria. Granted this, if the methane formation process is normally or inherently slower than that effectively carried out by the Group I bacteria in a conventional digester, it can be seen that improvement in the rate of gas evolution by the methane forming bacteria will result in a corresponding decrease in the residence time in the digester, or in the disposal of an increased volatile solids load at the same residence time. This improvement would also make possible a reduction in digester size, in case a new installation is being designed. This improvement is attained under the present invention.

Solution to the problem

In the present invention, the advantages just mentioned are attained by supplying the methane forming bacteria in the digester with a biologically usable source of energy, over, above and in excess of that derivable directly from and available to these bacteria from the materials in the primary sludge fed to the digester. The present invention converts the primary sludge into a "hypersludge," that is, a sludge having an increased available energy level. This results in either an increase in the reproduction rate of the methane forming bacterial family, or in an increases in the metabolism rate of the individuals, or both. These details are not known, but what is known is that a digester operated in accordance with the present invention requires less time for the transformation of fatty acids produced by the Group I bacteria into methane and carbon dioxide than does the same digester, operated in the same manner, without employing the present invention.

The best mode of practicing the invention known at this time, is to provide a hypersludge by the means of introducing anabolic material in the form of molecular hydrogen (gas) into the sludge. The effectiveness of this step is increased when the step is employed with a digester like that of the Forrest patent, wherein a diffuser is incorporated in the digester for recirculating gas through the sludge being digested therein.

The most economical method now known of practicing the present invention is that of forming the hypersludge by deriving hydrogen gas from the very stream of gas that is withdrawn from the digester, before it is recirculated through the digester. This is accomplished by bypassing some (or even all) of the recirculation digester gas externally of the digester, through a gas reformer or generator, thereby cracking the digester gas into hydrogen, carbon monoxide, and other minor gases. These gases are returned to the recirculated stream of gas before reintroducing the stream into the digester. However, in the broader aspects of the invention, and where hydrogen is used as the anabolic material, it can also be provided from a separate source. Even so, in installations where the gas evolved from the digester sludge is recirculated (as in the aforesaid Forrest patent), if a separate hydrogen source is employed, the hydrogen gas will be introduced into the recirculated stream, just as the hydrogen gas produced by cracking the recirculated stream is introduced, as described above.

The manner in which the present invention may be practiced by those skilled in the art will be more fully understood from the following detailed description of the invention.

In the drawings:

FIGURE 1 is a block diagram of a sewage disposal system showing a breakdown of the action that takes place within a primary sludge digester.

FIGURE 2 is a diagram of a sewage disposal plant including a primary sludge digester system embodying the present invention.

FIGURE 3 is a set of curves comparing the digester gas production of a control digester and a digester operated in accordance with the present invention, under various volatile organic solid loads.

FIGURE 1 is a block diagram of the flow of sewage through a system including the digester of the present invention. A typical sewage disposal system, starting with the raw sewage, will be described briefly in order that the present invention may be placed in its proper environment. The raw sewage enters a primary settling tank, the details of which are not pertinent to the present invention. In this tank certain materials settle out readily, and these materials are collected and withdrawn as the "primary sludge." The primary sludge comprises about 1% by volume of the raw sewage, and it can be collected and removed from the settling tank by techniques conventional in the art. At this point, it is noted that unless otherwise stated the percentages of composition are given by volume, but these are not exact because the composition of the starting material (raw sewage) is somewhat variable. The remainder of the raw sewage (about 99%) comprises solutions and suspensions in water, which are pumped to an activated sludge system or to a trickling filter.

It is the primary sludge, introduced into the digester, which is treated in accordance with the present invention. The digester tanks and equipment are in and of themselves conventional commercial units.

In FIGURE 1, the primary sludge within the digester is indicated in a "box," and in accordance with the plan of the presentation of FIGURE 1, the primary sludge is now taken on the basis of 100%, although it represents only 1% of the raw sewage. As can be seen from the diagram, the primary sludge is actually a water suspension of solids (5% by weight) in water (95%). These solids are not to be confused with the solutions and suspensions which are carried off from the raw sewage in the primary settling tank to the activated sludge, trickle filters or other sewage treatment devices, and with which the present invention is not concerned.

As can be seen in FIGURE 1, the primary sludge solids (now taken on the basis of 100%), are made up of approximately 20% inert matter such as ash, sand, etc., and 80% of organic matter, referred to as organics or organic solids in the diagram. The organic solids include a group of non-biodegradeable and relatively inoffensive solids, which after digestion of other organics readily settle out and present no further problem in the digestion cycle. As to the organic colloids (now taken on a basis of 100%), 50% of these are non-biodegradeable. These solids include such organic materials as cellulose, lignin, keratins, etc. The non-biodegradeable organic solids, the inorganics, and the ash from the degraded organics, form the solids content of a sludge referred to as "digested sludge," which is the principal output of the digester. The digested sludge, which is made up of approximately 4% solids and 96% water, may be pumped to a settling tank for dewatering in a settling tank, and on to the sludge beds, as shown in the Forrest patent.

The other 50% of the organic solids are biodegradeable, often referred to as "volatiles," and it is the transformation of these which represents the focus of the present invention. As mentioned, this group of solids, which is principally made up of fats, proteins and carbohydrates, includes those which cause the offensive characteristics of sewage as well as causing a colloidal suspension of other solids in the digester. Digestion, then, reduces the colloidal suspension and improves the dewatering characteristics of the remaining sludge.

The principal function of the digester is the degradation of the biodegradeable organic solids. As previously mentioned, this is accomplished by bacterial metabolism which ferments, reduces, converts or transforms these solids into gases and liquids.

As was also previously mentioned, the conversion and transformation of the fats, proteins and carbohydrates into digester gases is a series reaction, the first step of which must be by the Group I bacteria. These bacteria assimilate the biodegradeable solids, and by the formation of intermediary intercellular substances, convert these organics into fatty acids, alcohols, several gases and other elements and compounds as illustrated in the diagram of FIGURE 1. The end product of the Group I bacteria metabolic actions is principally fatty acids, particularly those of lower molecular weight. Of these it has also been found that in the degradation of fats, proteins and carbohydrates to fatty acids and other materials, the terminal product is predominantly acetic acid.

The alcohols produced include ethanol and methanol. Some ammonia is produced, but it and a small amount of molecular hydrogen that is produced are assimilated by the bacteria in the digester as an energy source and do not appear as digester gas output products. Carbon dioxide is also produced by the Group I bacteria. Some of the carbon dioxide is assimilated by the methane forming bacteria, and some appears in the outlet pipe for the evolved digester gases.

Methane forming bacterial action

The methane forming bacteria are believed to derive the cellular energy necessary for the production of methane from the organic acids by the following route:

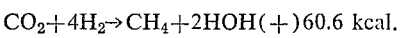

$$CO_2 + 4H_2 \rightarrow CH_4 + 2HOH (+) 60.6 \text{ kcal.}$$

It will be noted that this reaction of carbon dioxide and molecular hydrogen in producing methane is constructive metabolism or anabolism, and hence is an energy yielding process to the bacterial cells. It provides cellular energy for the bacteria, either for their reproduction or for increasing their rate of metabolism of other substances, including catabolism. The exact details of utilization of such energy are not known but their effects are, and are employed in the invention.

When the methane forming bacteria have acquired sufficient energy, such as by the route given above, these bacteria are prepared for metabolizing the various organic acids produced by the Group I bacteria. The reaction of the methane forming bacteria with acetic acid is believed to be the following catabolic reaction:

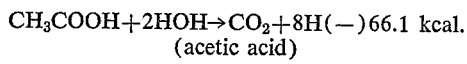
(acetic acid)

Here, the reaction is one of dissimilation, in that it requires derivation of energy from the bacterial cells. Carbon dioxide (available from the above as well as being in surplus in the digester) and the hydrogen thus produced are converted into methane by the reaction given previously, which is anabolic. There are other metabolic reactions involving the fatty acids, e.g., formic acid which is anabolic, but the acetic acid reaction dominates. The net effect of all of the fatty acid reactions is catabolic, which is a significant limiting factor in prior digesters, because the amount of material produced by the Group I bacteria which is anabolic to the methane forming bacteria, is relatively limited.

To summarize, since acetic acid is the principal metabolic product of the Group I bacteria, and since its transformation (dissimilation) into methane abstracts cellular energy (catabolism), it can be understood why the methane forming materials are believed to be the causes of undesirably long delays in the digestion process, with a given volatile organic solids loading.

The alcohols, the ammonia and the carbon dioxide, which are also produced by the Group I bacteria, are believed to be assimilated metabolically by the methane forming bacteria as intermediaries in the production of methane, and hence do not appear in the digester gases.

As to the hydrogen produced by Group I, since this material is a source of cellular energy (anabolic) to the methane forming bacteria, all of it is assimilated by the methane forming bacteria, and hence in standard digestion processes, hydrogen gas does not appear in the analysis of the digester gases.

The effect of loading

"Loading," as the term is used here, and as it is used in the industry relative to anaerobic digestion, refers to the rate of addition of volatile organic solids (via the primary sludge) to a given digester. This loading of volatile solids is usually expressed in such units as pounds of volatile solids per cubic foot of digester capacity, or the like. Since the usual primary sludge input to a digester contains approximately 95% water, and since the ash and non-biodegradeable organic solids are inert and pass unchanged through the digester, in evaluating digester performance the principal considerations are the loading of the volatile organic solids and the digester gas production.

Since the conversion of biodegradeable organics into digester gases is a series action, terminating in the action of the methane forming bacteria, and since the Group I bacteria appear to function about twice as rapidly as do the methane forming bacteria, the Group I bacteria (when functioning normally) will produce organic acids at a rate faster than that at which they are transformed into gas by the methane forming bacteria. As in the usual fermentation processes, the Group I effect is self limiting, because as soon as the fatty acids and alcohols reach a certain concentration in the solution in the digester, the Group I bacteria are destroyed, or their action is inhibited and little or no further organic acid production can take place.

However, the methane forming bacteria, although they are slower acting than the Group I bacteria, do continuously transform these organic acids into methane and carbon dioxide. Thus up to a certain loading, the methane forming bacteria prevent the pH of the digester solutions from becoming low enough to substantially inhibit or kill the Group I bacteria, and in so doing the methane forming bacteria also convert the organic solids into the digester gases.

As indicated in FIGURE 1, at any particular digester loading, if the Group I bacteria will convert biodegradeable organics into fatty acids and other components in X days, it will take 2X days for the methane forming bacteria to convert these products into digester gas and water.

The improvement of the present invention

The present invention accelerates the entire metabolic process, and hence renders less troublesome the inherent discrepancy between the reaction times of the Group I bacteria and the methane forming bacteria. Nothing can be done by presently known processes toward the improvement of this 1:2 ratio of residence times, but the over-all digestion process can be accelerated (up to a certain maximum loading) by utilizing the present invention.

It has been shown how cellular energy is derived by the methane forming bacteria by assimilation of carbon dioxide and hydrogen. It is true that some hydrogen results from the conversion of fats, etc., by the Group I bacteria into fatty acids. It has also been mentioned that hydrogen does not normally appear in the digester gas, and it was assumed that this hydrogen is assimilated by the methane forming bacteria for either increasing their metabolic rate or for increasing their reproductive rate. This hydrogen, which is derived from the primary sludge itself during the digestive process, and which does not appear at the gas outlet of a normally operating digester, has no effect on the ratio of activity rates (X and 2X) of the two groups of bacteria, as shown in FIGURE 1. However, in accordance with the present invention, and as mentioned in the opening remarks, the gas producing action of the methane forming bacteria in a given digester and with a given loading of volatile organic solids, can be increased by supplying the methane forming bacteria with a readily available (anabolic) source of cellular energy. In the present invention, this result is obtained by amending or augmenting the digesting sludge with molecular hydrogen gas to produce a "hypersludge," which is digested in about half of the time required to digest the primary sludge in the most efficient prior sewage disposal digesters.

As mentioned, it is not known whether the hypersludge so produced contains methane forming bacteria which metabolize the fatty acids more rapidly than they do in the normal sludge, or whether they simply reproduce more rapidly than they do in normal digesting sludge. However, this is immaterial because the results of practicing the present invention include formation of a hypersludge having a given volatile organic content which is digested more rapidly than normal.

Schematic system diagram

FIGURE 2 is a schematic diagram of a sewage disposal system embodying the present invention by digesting hypersludge. Raw sewage enters a primary settling tank 10 which is provided with the conventional primary sludge collector 12. The primary sludge is pumped or otherwise transported by means not shown to the anaerobic digester 14. This digester is preferably like that of the aforesaid Forrest patent, and includes the usual tank with a roof 16 for confining the digester gas.

The digested sludge is removed from the digester 14 by means of a pump 18 and is directed by a line 19 to a container 20, which serves as a settling basin or tank for separating the solids from the water in the digested sludge. The container 20 is a conventional unit or installation and its supernatant may be fed back to another part of the disposal system for further treatment in a conventional manner. If the container 20 is covered as shown in the present example, any gas evolved, which includes methane and carbon dioxide, may be readmitted to the digester circulatory system, if desired, by connecting lines 22 and 24, although this is not essential to the invention.

In order to render the primary sludge digestion process more efficient, a portion of the digester sludge is withdrawn from the output line 19 leading to the container 20 by means of a pump 30 and a branch line 31, passed to a heater 32, and returned to the digester tank via a line 33. Although an external heater is shown, an internal heater may be employed, the details of this phase of the digestion process not being critical to the invention.

In the present digester, as in the aforesaid Forrest patent, a fixed gas diffuser 34 is mounted at the end of a pipe 36 which extends down through an aperture in the roof of the digester tank and into the body of primary sludge. The total digester gas produced (approximately 70% $CH_4$ and 30% $CO_2$) is withdrawn from the digester tank through a line 40. A portion of the digester gas produced is recirculated by a blower 42 in a recirculation line 44 which receives gas off from the line 40 via a first branch line 40a and directs it to the pipe 36 leading to the diffuser 34. A net digester gas production or outlet line 46 connects to the line 40a, and delivers to various points the net digester gas production. A check valve 48 is in the outlet line 46 to keep the digestion anaerobic and is so shown diagrammatically in FIGURE 2. It prevents air from being drawn back into the system by the blower 42.

The formation of hypersludge

Referring to FIGURE 2, in the system of the present invention, a gas reformer 50 is incorporated into the gas recirculation system of the digester. The gas reformer 50, may be a commercially available unit such as a "Surface Gas Generator," Model RX, SRX, ASRX, etc., produced by the Surface Combustion Division of Midland-Ross Corporation, of Toledo, Ohio. These generators receive hydrocarbons, such as the methane contained in the digester gas. By means of a catalyst and heat energy, the reformer 50 cracks the hydrocarbons into a reducing gas mixture, preferably comprising principally hydrogen, usually associated with carbon monoxide, and minor gases.

As seen in FIGURE 2, the input line 52 for the gas reformer 50 is a second branch of the digester gas line 40, and the output line 54 of the gas reformer directs the disassociated digester gas to the recirculation line 44, upstream of the blower 42. A control or throttle valve 56 is fitted in the first branch line 40a, and hence valve 56 and the gas reformer 50 are connected in parallel between the digester gas line 40 and the recirculation line 44. The gas reformer 50 provides for the introduction of the air or oxygen necessary for the digester gas cracking process, as well as supplying the heat of reaction, either electrically or by combustion. The throttle valve 56 controls the process of producing hypersludge. The control element details are not critical to the invention. In the form shown, the control is simplified by the parallel connection of the valve 56 and the gas reformer 50. It is the function of the control valve 56 to optimize net digester gas production in line 46, while minimizing the heat requirements for the gas reformer 50 necessary to produce hypersludge. In a normally operating anaerobic digester of the type to which this invention relates, substantially no hydrogen gas will appear in the total digester gas produced in line 40. As mentioned, this probably occurs because of the fact that the Group I bacteria are capable of producing organic acids before the acid concentration limiting action takes place, at a rate faster than the methane forming bacteria are capable of transforming the fatty acids into methane and carbon dioxide. Thus, the methane forming bacteria are, in effect, ever seeking additional sources of anabolic energy. As indicated by the formula previously given, hydrogen and carbon dioxide together provide a readily utilizable source of such energy. The carbon dioxide is almost always in excess in a digester, so that it is the hydrogen content which is believed to be the limiting factor, and this has been proven by the results of operating a digester under the present invention.

Thus it has been found that an operator, knowing the hydrogen content (including the absence of hydrogen) of the digester gas in line 40, such as by a hydrogen indicator at 60, can operate the valve 56 to optimum operating conditions. Indicator 60 is a commercial unit, such as a Beckman model 7C thermal conductivity meter type gas analyzer. The mode of control will generally be as follows:

With the system in operation, and with the gas reformer 50 functioning, the throttle valve 56 will be slowly closed while observing the hydrogen indicator 60. Initially there will be no indication of hydrogen in the digester gas. However, if a flow metre were to be introduced into the digester gas line 40, it would be noted that as the throttle valve 56 is closed, thereby bypassing more and more of the digester gas through the gas reformer 50, the digester gas flowing in line 40 would increase.

Since the closing of the control valve 56 results in the bypassing of more digester gas into the gas reformer 50, with a resultant increase in the hydrogen input through the recirculation line 44, this action may require an increased heat input to the gas reformer. However, commercial units of the type referred to perform this function automatically.

If the gas reformer has sufficient capacity and if the digester is operating normally, a point will be reached whereupon the hydrogen indicator 60 begins to indicate the presence of, or an increase in, a relatively small amount of hydrogen in the digester gas production line 44. This is a signal that the digester contains hypersludge, and hydrogen is now being dispersed into the sludge in the digester at the optimum rate. Since a slight excess of hydrogen is now being recirculated, the methane forming bacteria are operating at their optimum rate, and are transforming the organic acids produced by the Group I bacteria into digester gas and water. To further enrich the recirculated gas in line 40 with hydrogen, would be to waste heat in the gas reformer 50.

In a system operating in accordance with the above principes, the residence time of a given batch of primary sludge in the digester necessary to biologically degrade all the organic solids will be substantially reduced, and may be as little as half as long as the time required to process the same organic solids load in a digester which does not contain hypersludge.

Comparative operation

In order to evaluate the effects of digester action on a hypersludge, an experiment was planned to compare the operation of a recirculation type control digester with one of the same type having hydrogen enrichment to produce a hypersludge. The nature of the experiment is indicated in FIGURE 3. The digesters were equally loaded with the same quantity of primary sludge from a municipal sewage disposal installation. At the beginning of each new period, such as each day, a unit volume of digested sludge was withdrawn from each digester and replaced by the same volume of primray sludge, referred to as the "Volatile Solids Load." The net (volume) digester gas production (line 46, FIG. 2) was determined over each period. This process is carried on from period to period (the test periods having been one twenty-four hour day) and the results of the experiment represented by FIGURE 3. The initial volatile solids load was selected to be within the expected capabilities of the control digester. A selected loading was often maintained for several periods. After several initial periods (e.g. the eighth, twelfth, fourteenth day, etc.), the volatile solids load was increased and this loading procedure continued. As to be expected, the volume of the net digester gas production for each period increased as the experiment progressed. The gas production of the control digester peaked after thirteen days, and after working for one day on a sludge to which a volatile solids load of 37 weight units per unit volume of the digester (digester capacity) had been introduced. Net digester gas production then fell off abruptly, indicating that the organic acid concentration in the sludge of the control digester was sufficient to inhibit the activity of the Group I bacteria.

The amended gas digester, having the hypersludge produced by the system of the present invention, consistently provided a higher net digester gas production in each period than did the control digester. Since the methane forming bacteria and the Group I bacteria act "in series," this indicates that the methane forming bacteria were effectively transforming the organic acids into gas, and that this, in turn, accelerated the action of the Group I bacteria. The fact that before peaking, increased volumes of digester gas were produced as the volatile solids loadings were continued and in fact, increased, indicated that the bacteria in both digesters were operating at substantially their optimum effectiveness under their particular environments.

As seen in FIGURE 3, peaking and drop-off of the amended gas digester of the present invention did not occur until this digester had operated under a daily volatile solids loading of 50 units for six days, and at the thirty-first day of the experiment. The control digester had been operating under a volatile solid load of only 37 units, and for only a single day at the time of its drop-off. It appears that the amended gas digester of the present invention could have continued operation indefinitely on a volatile solids load of 49 units with a net digester gas production of 18 units, as illustrated by the broken curve in the upper right of FIGURE 3. This slight decrease in loading represents a steady digester gas production of 15 volume units, as compared to less than 12 units for the control digester. The acceptable solids loading of the amended gas digester of the present invention at 49 units, would exceed by 32% the peak loading of the control digester, and would exceed the steady operating loading of the latter by a still higher percentage.

In the system of FIGURE 2, wherein the hydrogen gas is introduced into the digester gas recirculation system, once a steady state condition has been achieved, and assuming that there are not radical fluctuations in the nature of the primary input sludge, the system itself is self-balancing. A certain amount of digester gas is always being recirculated by withdrawal from line 40 by means of the blower 42 and the reintroduction through line 44 leading to the diffuser 34. This recirculation has little effect on the net digester gas production in line 46, once a steady state gas production condition in line 40 has been established. Under the stable equilibrium conditions referred to, there will always be a relatively steady net digester gas production (principally methane and carbon dioxide) in line 46. However, under the preferred embodiment of the invention in FIGURE 2, the volatile solids loading will be increased, and the total digester gas produced in line 40 will exceed the net digester gas production in line 46.

Modifications

The preferred method of practicing the present invention involves the use of a digester fitted with a digester gas recirculation system and a dispersing unit such as unit 34 of FIGURE 2, disclosed more completely in the Forrest patent. It is also preferred to introduce hydrogen gas into the dispersion system, and to produce such gas by a gas reformer that is connected into the digester gas recirculation line.

However, under the broader aspects of the invention, the gas reformer can be replaced by a source of pure hydrogen, or a mixture of hydrogen and other gases, where hydrogen mixtures thereof are economically obtainable. Likewise, it is also contemplated that in the broader aspects of the invention, the gas recirculation and diffuser system can be operated independently of the admission of molecular hydrogen gas to the digester from a separate source. In this mode of operation, hydrogen gas would be introduced (by means not shown) directly into the digester tank, instead of into the recirculation line as illustrated in FIGURE 2.

In the embodiment described above, the sludge entering the digester has been designated as "primary sludge," but the source of the sludge is not critical to the invention. It is to be understood that in the appended claims, the term "primary sludge" includes sewage sludge from sources other than a primary settling tank, such as sludge from an aeration tank, a trickle filter, or from any other source.

Having completed a detailed description of the invention so that those skilled in the art may practice the same, I claim:

1. In a process for the anaerobic digestion of sewage sludge in a digester wherein biodegradeable solids in the sludge are converted by a first group of bacteria into fatty acids, wherein the fatty acids are transformed into water, methane gas and gaseous carbon dioxide by methane forming bacteria; the improvement removing the digester gases from the digester, adding energy to at least a portion of the digester gases, cracking them into hydrogen and other gases, and introducing at least the hydrogen gas into the sludge in the digester for assimilation by the methane forming bacteria, with a resultant increase in fatty acid transformation by those bacteria.

2. The process of claim 1, comprising the steps of determining the hydrogen content of the digester gases, and adjusting the amount of hydrogen gas introduced into the sludge accordingly.

3. The process of claim 2, wherein said adjustment is made to maintain a detectable, but minimum amount of hydrogen gas in the digester gases.

4. Apparatus for the anaerobic bacteriological digestion of primary sewage sludge, comprising a digester tank, means for introducing the primary sludge into the tank, means for removing the digester gases from the tank, means for converting the digester gases so removed into gaseous hydrogen and other gases, means for dispersing the gaseous hydrogen derived from said conversion through the sludge in said digester tank at a rate substantially exceeding the rate at which any hydrogen gas surplus is generated by the metabolism of the bacteria in the sludge, and means for removing the digested sludge from the digester.

5. A process for the anaerobic digestion of sewage sludge comprising the steps of introducing the sludge into an anaerobic digester, removing the digested sludge from the digester, removing the digester gas from the digester, sensing the hydrogen content of the digester gas, dividing the digester gas into two parallel branches, returning gas from both branches to the digester, removing the net gas production from one branch, reforming digester gas in the other branch into hydrogen and carbon monoxide, and maintaining the relative flow in the branches such that hydrogen can be sensed in the digester gas.

6. The process of claim 5, wherein the relative flow in the branches is maintained so that the hydrogen content in the digester gas is at a low value.

7. Apparatus for the anaerobic bacteriological digestion of sewage sludge, comprising a digester tank, means for introducing the sludge into the tank, means for removing digested sludge from the tank, means for removing digester gas from the tank, means for sensing the presence of hydrogen in the digester gas so removed, means for converting a portion of the digester gas so removed into hydrogen gas and other gases, means for dispersing both hydrogen gas derived from said conversion and unconverted digester gas removed from the tank through the sludge in the tank, and means for regulating the digester gas conversion to introduce hydrogen gas into the digester tank at a rate substantially exceeding the rate at which any hydrogen gas surplus is generated by the metabolism of the bacteria in the sludge.

8. A process for anaerobically digesting sewage sludge comprising the steps of confining the sludge in an anaerobic digester, introducing and dispersing into the sludge hydrogen in a form that is anabolic for methane forming bacteria, removing digester gases from the digester, determining the presence or absence of hydrogen in the digester gases removed, and controlling the introduction of the hydrogen to the digester so that some hydrogen is present in said removed digester gases, thereby indicating that the energy requirements of the methane forming bacteria have been met.

9. The process of claim 8, wherein the anabolic material is introduced in the form of molecular hydrogen gas.

10. In a process for the anaerobic digestion of sewage sludge wherein biodegradeable solids in the sludge are converted by a first group of bacteria into fatty acids, wherein the fatty acids are transformed into water, methane gas and gaseous carbon dioxide by methane forming bacteria, and wherein these gases are removed from the sludge as they are formed; the improvement comprising the steps of providing an anabolic material for the methane forming bacteria in the form of hydrogen, and introducing said anabolic material into the sludge under treatment for assimilation by the methane forming bacteria with a resultant increase in fatty acid transformation by those bacteria, the quantity of anabolic material thus introduced being selected as sufficient to supply the difference between the metabolic energy derivable by the methane forming bacteria directly from the sludge and from any anabolic fatty acids formed by said first group of bacteria, and the energy required by the methane forming material to perform the aforesaid transformation of said fatty acids at a transformation rate adequate to prevent the pH of the digester solutions from becoming low enough to substantially inhibit the activity of said first group of bacteria.

11. Apparatus for the anaerobic bacteriological digestion of sewage sludge, comprising a digester tank, means for introducing the sludge into the tank, means for removing digested sludge from the tank, means for removing digester gas from the tank, means for sensing the presence of hydrogen in the digester gas so removed, means for dispersing both hydrogen gas and digester gas removed from the tank through the sludge in the tank, and means for maintaining the rate of introduction of hydrogen gas into the sludge at a value high enough to insure that hydrogen gas is present in the digester gas so removed.

References Cited

UNITED STATES PATENTS 2,777,815   1/1957   Forrest _____ 210—3

OTHER REFERENCES

Campbell, F. L., et al.: notes on the more unusual Imhoff tank gases, New Jersey Agrl. Expt. Sta. Bull. 427 (1926), pp. 86–89, 100 and 101.

Heukelekian, H., Basic Principles of Sludge Digestion, appearing in Biological Treatment of Sewage and Industrial Wastes, vol. II, Anaerobic Digestion, etc., edited by McCabe et al., 1958, Reinhold, N.Y., pp. 25–28 and 33–43 relied on (POSL).

MICHAEL E. ROGERS, *Primary Examiner.*